N. B. OSGOOD.
Reciprocating Churn.
No. 201,625. Patented March 26, 1878.
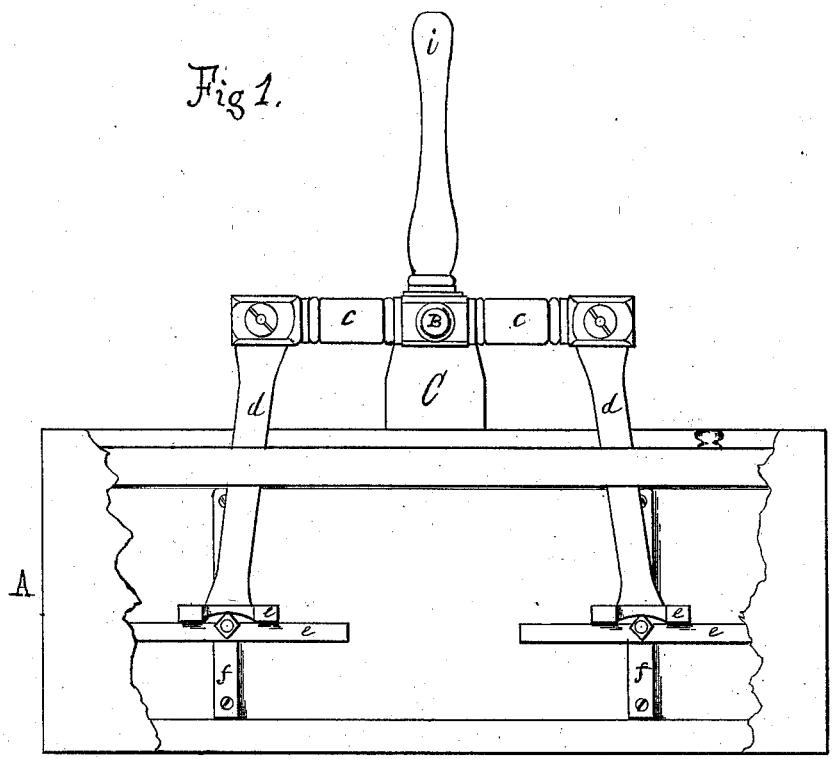
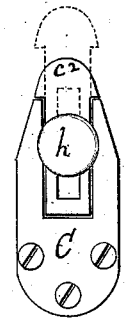
WITNESSES
James O'Neil Jr.
H. L. Piper
INVENTOR
Napoleon B. Osgood
Per Horace Piper
ATTORNEY

UNITED STATES PATENT OFFICE.

NAPOLEON B. OSGOOD, OF BIDDEFORD, MAINE.

IMPROVEMENT IN RECIPROCATING CHURNS.

Specification forming part of Letters Patent No. 201,625, dated March 26, 1878; application filed December 17, 1877.

*To all whom it may concern:*

Be it known that I, NAPOLEON B. OSGOOD, of Biddeford, in the county of York and State of Maine, have invented a new and Improved Churn, of which the following is a specification:

My invention relates to that class of churns having two dashers suspended to a horizontal brake attached to a rocker shaft or axle, and operated by an upright lever affixed to the axle at right angles with the brake.

The body of the churn is in the form of an oblong box, the length being about twice its width. The cover is so formed as to sink even with the edges of the churn-body, resting upon a molding in such a manner as to prevent leakage. There are oblong openings in the cover, in and through which the dashers operate. The dasher-blades are flat, crossed at right angles, and attached to the foot of the dasher by a bolt, which allows the dasher to swing freely as it rises and falls. Upon both sides of the churn, within, there is a molding or bead opposite one of the dasher-blades, which serves to keep the dasher-blades in position, the blades being notched to receive it. One dasher is attached to each end of the horizontal brake by a bolt passing through the brake and dasher, secured by a nut, all in such a manner as to permit the dasher to swing freely when operated. The horizontal brake extends at right angles from the axle to the dashers. The axle-journals rest in bearings elevated a sufficient distance above the body of the churn to afford room for the working of the brake. These bearings, alike on both sides of the churn, have movable caps, which hold the axle in place. The outer side of the cap is elongated and fitted to a groove in the standard beneath it, and in this elongated portion there is a slot, through which a set-screw passes, and with the use of a washer, when tightened, holds the cap firmly in place. By loosening the set-screw the axle and all its appendages, including the churn-cover, may be entirely detached and removed from the churn-body.

By the use of this churn butter can be obtained with great economy of time and labor.

The alternate movements of the dashers constantly agitate the cream, producing and gathering the butter very rapidly.

Figure 1 is a longitudinal sectional view of the churn. A is the body of the churn; B, the axle of the brake or lever; C, the bearing of the axle; $c\,c$, the brake; $d\,d$, the dashers; $e\,e$, the dasher-blades; $f\,f$, the beads that guide the dasher-blades; $i$, the upright working-lever.

Fig. 2 represents one of the parts by which the axle is attached to the churn, the other part being a duplicate. C is the attachment containing the journal-box. $c^2$ is the cap or upper half of the journal-box, which may be slipped up by loosening the set-screw $h$, so that the cover and dashers may be removed.

I wish it to be distinctly understood that I do not claim the parts composing my device separately, as I am aware that they are not new; neither do I claim two dashers suspended from a horizontal brake attached to a rock-shaft and operated by a handle at the end of said brake, and I disclaim the same.

I claim as my improvement—

The dasher-actuating mechanism herein described and shown, consisting of the rocking bar or brake $c$, the rods or bars $d$, hinged to the rocking bar and to the dashers, and the vertical hand-lever $i$, as set forth.

NAPOLEON B. OSGOOD.

Witnesses:
EDMUND H. GRAHAM,
WILBUR F. LUNT.